US00RE36568E

United States Patent [19]

Horst

[11] E Patent Number: Re. 36,568

[45] Reissued Date of Patent: Feb. 15, 2000

[54] CURRENT DECAY CONTROL IN SWITCHED RELUCTANCE MOTOR

[75] Inventor: Gary E. Horst, Manchester, Mo.

[73] Assignee: Emerson Electric Co., St. Louis, Mo.

[21] Appl. No.: 08/920,112

[22] Filed: Aug. 26, 1997

Related U.S. Patent Documents

Reissue of:

[64] Patent No.: 5,446,359
Issued: Aug. 29, 1995
Appl. No.: 08/175,268
Filed: Dec. 29, 1993

[51] Int. Cl.[7] ..... H02P 7/36

[52] U.S. Cl. ..... 318/701; 318/254; 318/696

[58] Field of Search ..... 318/254, 696, 318/701, 702, 724, 685, 138, 439

[56] References Cited

U.S. PATENT DOCUMENTS

| | | | |
|---|---|---|---|
| Re. 34,609 | 5/1994 | Mueller | 318/254 |
| 747,698 | 12/1903 | Geisenhoner . | |
| 4,164,696 | 8/1979 | Kastilahn et al. | 318/696 |
| 4,213,070 | 7/1980 | Lund et al. | 310/71 |
| 4,249,116 | 2/1981 | Hieda | 318/254 |
| 4,253,053 | 2/1981 | Ray et al. | 318/701 |

(List continued on next page.)

FOREIGN PATENT DOCUMENTS

| | | | |
|---|---|---|---|
| 0 557 811 A1 | 9/1993 | European Pat. Off. | H02P 6/02 |
| 0 749 202 A1 | 12/1996 | European Pat. Off. | H02P 7/05 |
| 4 036 565 A1 | 5/1992 | Germany | H02P 8/00 |
| 3-089897 | 4/1991 | Japan | H02P 8/00 |
| 2 167 253 | 5/1986 | United Kingdom | H02P 6/00 |
| 2 167 910 | 6/1986 | United Kingdom | H02K 1/06 |
| WO 93/05564 | 3/1993 | WIPO | H02P 6/02 |
| WO 94/28618 | 12/1994 | WIPO | H02P 6/02 |

OTHER PUBLICATIONS

F. Blaabjerg et al., "Investigative and Reduction of Acoustical Noise from Switched Reluctance Drives in Current and Voltage Control," Sep. 5–71994, Proc. ICEM '94, pp. 589–594.

C. Y. Wu and C. Pollock, "Analysis and Reduction of Vibration and Acoustic Noise in the Switched Reluctance Drive," 1993, Proceedings of the IAS '93, pp. 106–113.

S. Chan et al., "Performance Enhancement of Single–Phase Switched–Reluctance Motor by DC Link Voltage Boosting," Sep. 1993, IEEE Proceedings–B, vol. 140, pp. 316–322.

(List continued on next page.)

*Primary Examiner*—Bentsu Ro
*Attorney, Agent, or Firm*—Arnold, White & Durkee

[57] ABSTRACT

A control circuit (10) for controlling the residual or tail current decay in a single phase or polyphase SRM winding when a phase is switched from active to inactive. A Hall-effect type sensor (30) senses rotor position of the SRM. Current flows through a winding (W) of the motor when the motor phase winding is active; and, current flow into the winding decays to zero when the phase becomes inactive. Semiconductor switches (22) direct current flow into the winding when the phase is active and then redirect residual energy in the winding between an energy recovery circuit and an energy dissipation circuit when the phase becomes inactive. A PWM signal generator (44) provides PWM operating signals to the switches to control current flow first into the winding and then between the recovery and dissipation circuits. A control module (42), or microprocessor (52) with a PWM output, is responsive to rotor position information for controlling operation of the PWM signal generator. The signal generator provides PWM signals having one set of signal characteristics when there is current flow to the winding and a different set of characteristics when there is not. This produces alternate intervals of zero voltage and forced commutation residual current decay while the phase is inactive. During the decay interval, both the PWM frequency and pulse duty cycle are variable to produce a current decay scheme which eliminates ringing and motor noise.

42 Claims, 4 Drawing Sheets

U.S. PATENT DOCUMENTS

| | | | |
|---|---|---|---|
| 4,427,910 | 1/1984 | Richter et al. | 310/214 |
| 4,447,771 | 5/1984 | Whited | 318/661 |
| 4,488,101 | 12/1984 | Studtmann | 388/800 |
| 4,500,824 | 2/1985 | Miller | 318/701 |
| 4,520,302 | 5/1985 | Hill et al. | 318/696 |
| 4,563,619 | 1/1986 | Davis et al. | 318/138 |
| 4,661,756 | 4/1987 | Murphy et al. | 318/701 |
| 4,670,696 | 6/1987 | Byrne et al. | 318/701 |
| 4,691,038 | 9/1987 | MacMinn | 318/696 |
| 4,712,050 | 12/1987 | Nagasawa et al. | 318/254 |
| 4,731,570 | 3/1988 | Lee | 318/696 |
| 4,761,580 | 8/1988 | Hein et al. | 310/214 |
| 4,849,873 | 7/1989 | Vanderhelst | 363/55 |
| 4,859,921 | 8/1989 | Archer | 318/599 |
| 4,868,477 | 9/1989 | Anderson et al. | 318/696 |
| 4,933,621 | 6/1990 | MacMinn et al. | 318/696 |
| 4,943,760 | 7/1990 | Byrne et al. | 318/701 |
| 5,072,166 | 12/1991 | Ehsani | 318/696 |
| 5,075,610 | 12/1991 | Harris | 318/701 |
| 5,097,191 | 3/1992 | Bahn | 318/701 |
| 5,119,000 | 6/1992 | Schultz | 318/254 |
| 5,124,604 | 6/1992 | Rieber et al. | 310/214 |
| 5,124,607 | 6/1992 | Rieber et al. | 310/214 |
| 5,140,207 | 8/1992 | Baumeister | 310/83 |
| 5,144,209 | 9/1992 | Ingji et al. | 318/254 |
| 5,175,458 | 12/1992 | Lemmer et al. | 310/71 |
| 5,196,775 | 3/1993 | Harris et al. | 318/638 |
| 5,239,217 | 8/1993 | Horst | 310/51 |
| 5,239,220 | 8/1993 | Taji et al. | 310/214 |
| 5,270,603 | 12/1993 | Narumi | 310/260 |
| 5,296,785 | 3/1994 | Miller | 318/254 |
| 5,343,105 | 8/1994 | Sakabe et al. | 310/179 |
| 5,373,206 | 12/1994 | Lim | 310/68 |
| 5,461,295 | 10/1995 | Horst | 318/701 |
| 5,479,080 | 12/1995 | Jones et al. | 318/701 |
| 5,487,213 | 1/1996 | Hult et al. | 29/556 |
| 5,563,488 | 10/1996 | Stephenson et al. | 318/701 |
| 5,589,752 | 12/1996 | Iwasaki et al. | 318/701 |

OTHER PUBLICATIONS

Stephenson and Blake, "The Characteristics, Design and Applications of Switched Reluctance Motors and Drives," PCIM Conference & Exhibition, Jun. 21–24, 1993, Nuremberg, Germany.

D. E. Cameron et al., "The Origin and Reduction of Acoustic Noise in Doubly Salient Variable–Reluctance Motors," Nov./Dec. 1992, IEEE Transactions on Industry Applications, vol. 28 No. 6, pp. 1250–1255.

Shi–Ping Hsu et al., "Modeling and Analysis of Switching DC–to–DC Converters in Constant–Frequency Current–Programmed Mode," 1979, IEEE Power Electronics Specialists Conference, pp. 284–301.

Frede Blaabjerg and John K. Pedersen, "Digital Implemented Random Modulation Strategies for AC and Switched Reluctance Drives," *Proceedings of the IECON'93*, pp. 676–682, International Conference on Industrial Electronics, Control and Instrumentation, Maui, Hawaii, Nov. 15–19, 1993.

Richard S. Wallace and David G. Taylor, "A Balanced Commutator for Switched Reluctance Motors to Reduce Torque Ripple," *IEEE Transactions on Power Electronics*, vol. 7, No. 4, pp. 617–626, Oct. 1992.

Richard S. Wallace and David G. Taylor, "Low–Torque–Ripple Switched Reluctance Motors for Direct–Drive Robotics," *IEEE Transactions on Robotics and Automation*, vol. 7, No. 6, pp. 733–742, Dec. 1991.

Richard S. Wallace, Jr., "Design and Control of Switched Reluctance Motors to Reduce Torque Ripple," Georgia Institute of Technology, Nov. 1990.

Charles Pollock and Barry W. Williams, "A Unipolar Converter for a Switched Reluctance Motor," *Conference Record of the 1988 IEEE Industry Applications Society Annual Meeting*, pp. 44–49, Pittsburg, Pennsylvania, Oct. 2–7, 1988.

C. Pollock and C. Y. Wu, "Acoustic Noise Cancellation Techniques for Switched Reluctance Drives," *Record of the Industry Applications Conference* (*IAS*), vol. 1, pp. 448–455, Orlando, Florida, Oct. 8–12, 1995.

Abstract of Japanese patent application No. 06–086769 published as 07–298669 Nov. 10, 1995.

C. Y. Wu and C. Pollock, "Analysis and Reduction of Vibration and Acoustic Noise in the Switched Reluctance Drive," *IEEE Transactions on Industry Applications*, vol. 31, No. 1 pp. 91–98, Jan./Feb. 1995.

Analysis and Reduction of Vibration and Acoustic Noise in Switched Reluctance Device, C.Y. Wu and C. Pollock, University of Warwick, Coventry, CV47AL, U.K.

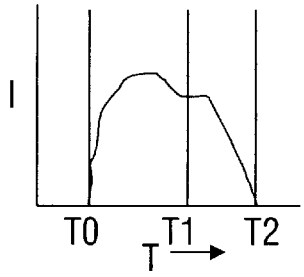
FIG. 1
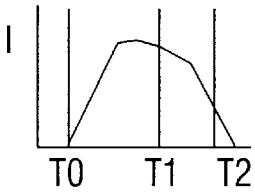
FIG. 2A
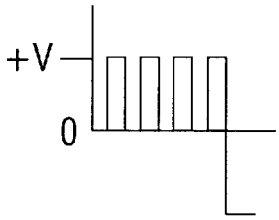
FIG. 2B (Prior Art)
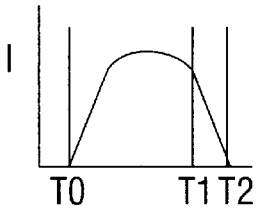
FIG. 3A
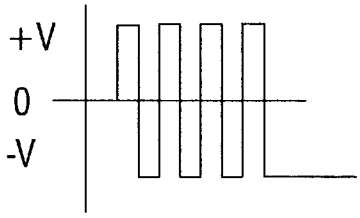
FIG. 3B (Prior Art)
FIG. 4A
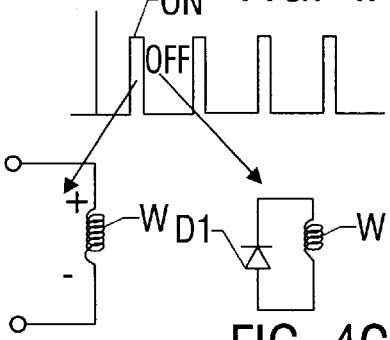
FIG. 4B
FIG. 4C
FIG. 5A
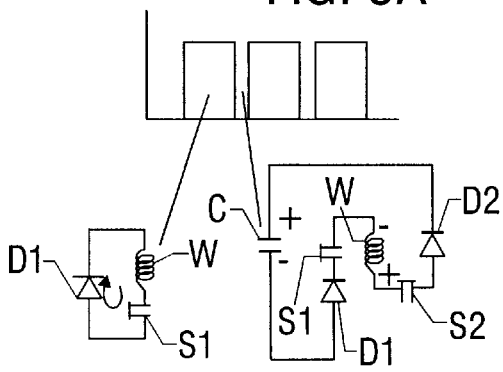
FIG. 5B
FIG. 5C

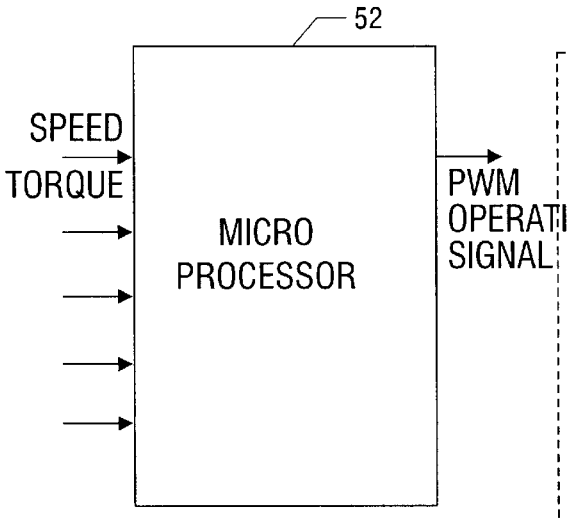
FIG. 7B
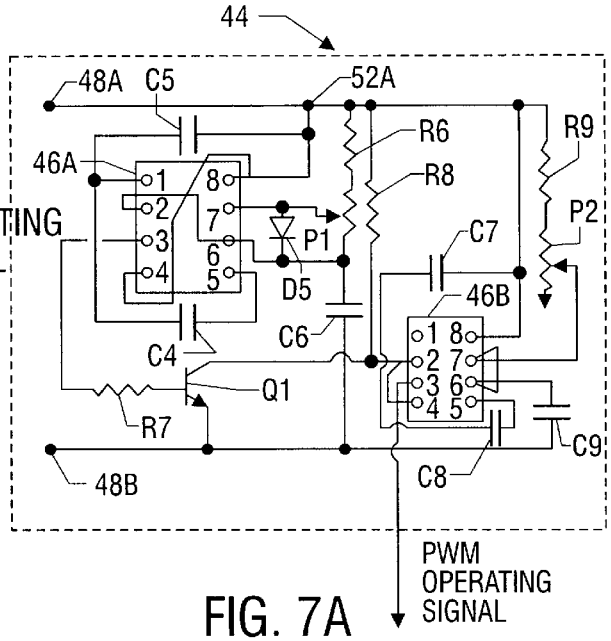
FIG. 7A
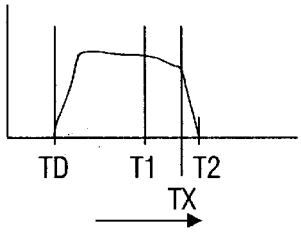
FIG. 8
(Prior Art)
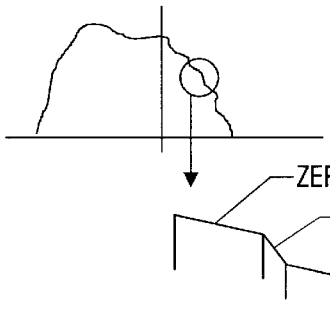
FIG. 9A
FIG. 9B

CURRENT DECAY CONTROL IN SWITCHED RELUCTANCE MOTOR

Matter enclosed in heavy brackets [ ] appears in the original patent but forms no part of this reissue specification; matter printed in italics indicates the additions made by reissue.

*REISSUE APPLICATION*

*This application is a Reissue application of U.S. Pat. No. 5,446,359, issued on Aug. 29, 1995 from the application Ser. No. 08/175,268, filed Dec. 29, 1993.*

BACKGROUND OF THE INVENTION

This invention relates to switched reluctance (SRM) motors and, more particularly, to a current decay control circuit for such motors.

Switched reluctance, or SRM motors are well-known in the art. One problem with operating these motors is noise caused by the recovery of current in the motor phase windings as each phase is switched at the end of its cycle. It will be understood that the current representing the energy input of a particular phase is supplied to the phase windings during that phase's active portion of a switching cycle. As the motor is switched from one phase to another, the residual energy in the deactivated winding decays off. This energy typically represents approximately thirty percent (30% ) of the energy supplied to the phase winding during its active period and is referred to as the "tail decay energy". Since the phase winding is an inductive element, it attempts to maintain the current flow through the winding; even though the energy must be substantially dissipated before the winding is re-energized during the next phase cycle. Accordingly, the decay must be a rapid decay. One effect of this energy reduction is the ringing effect which is caused at the transition between the active and inactive portions of the phase current curve. This can be seen as the abrupt transition in slope in the current curve between the shallow slope representing the active portion of the cycle and the steep slope where the current is driving to zero when the phase becomes inactive. The result of this ringing or transfer of forces into the motor frame causes noise, and this noise is on the order of 50 dBa.

Commutation circuits are used to control switching between motor phases as a function of various motor operating parameters. Such circuits typically employ a pulse width modulator (PWM). PWM circuits, in addition to controlling the application of voltage to the motor phases can also be used to control the residual current decay. These circuits operate to control this decay in accordance with a defined algorithm. However, it is a drawback of these decay control circuits that they use a conventional 100% forced commutation decay; and, as such, they tend to aggravate the noise problem. One attempt at decay is suggested by C. Y. Wu and C. Pollock in their paper Analysis and Reduction of Vibration and Acoustic Noise in the Switched Reluctance Drive; (IEEE Proceedings, Industrial applications Section, 28th, Annual Meeting, October 1993). The approach described in this paper involves a zero voltage decay of the current in a phase winding, when the phase is switched "off", over a period equal to one-half the resonant time period of the motor, and with a subsequent forced commutation of the remainder of the "off" time. The drawback with this approach is that there is but one decay interval divided into two segments. As a result, the degree of control over the slope of the curve as the current is driven to zero is not as flexible in significantly reducing the noise.

While the above approach may be effective, there are nonetheless other approaches which may be more effective to facilitate tail decay while reducing noise.

SUMMARY OF THE INVENTION

Among the several objects of the present invention may be noted the provision of a control circuit for controlling the residual or tail current decay in a motor winding; the provision of such a control circuit which controls tail current decay so as to lessen motor noise at least 10 dBA from current noise levels; the provision of such a control circuit which integrates both hard chopping and soft chopping current decay control techniques; the provision of such a current control circuit which provides both types of chopping using but a single gate drive; the provision of such a control circuit which is usable with both 2-phase and 3-phase SRM's such as a 12-6, 2-phase SRM and a 6-4, 3-phase SRM; the provision of such a control circuit which is readily incorporated into a PWM type controller for controlling overall average voltage applied to the respective phases of a SRM; the provision of such a control circuit which reverses the pulse width characteristics of a PWM signal used to control current flow when a winding phase is inactive thereby to help slow the rate at which current goes to zero while the phase is inactive; the provision of such a control circuit employing two sets of switches one set of which is either activated or deactivated as the motor phases are switched and the other set of which is modulated by PWM signals; the provision of such a control circuit to control both the frequency and/or duty cycle of PWM signals when a phase is switched from active to inactive thereby to better control the slope of the curve of the decay current; the provision of such a control circuit which controls switching of the winding between energy recovery and energy dissipation circuits to drive the residual current to zero; the provision of such tail current control circuit which is additionally effective to help reduce noise in SRM's operating at low speed/high torque conditions where normalized ovalizing forces which also produce noise in SRM's are lower than at high speed/low torque motor operating conditions; the provision of such a control circuit to employ a microprocessor which can produce a wide range of decay schedules based upon particular motor conditions; the provision of such a control circuit which can operate at frequencies at least twice the resonant frequency of the motor; and, the provision of such a control circuit which is a low cost, reliable circuit which functions to reduce noise throughout the range of SRM operation.

In accordance with the invention, generally stated, a control circuit is used for controlling residual or tail current decay in a single or polyphase SRM. A Hall-effect type magnetic sensor senses rotor position of the SRM. Current flows through the winding when the motor phase represented by the winding is active; and, current flow into the winding ceases when the phase becomes inactive. Semiconductor switches direct current flow into the winding when the phase is active and also help recover or dissipate residual energy in the winding when the phase becomes inactive. This is accomplished by switching the winding between an energy recovery circuit and an energy dissipation circuit in a defined manner. A PWM signal generator provides PWM operating signals to the switches to control current flow into the winding and its subsequent recovery or dissipation. A PWM control module, or microprocessor with PWM output, is responsive to the Hall sensor for controlling operation of the PWM signal generator. As a result, the signal generator provides PWM signals having signal characteristics which differ between when there is current flow to the winding and when there is not. The frequency and duty cycle of the PWM signals when the phase is inactive are variable to control the slope of current decay and reduce motor noise. Other objects and features will be in part apparent and in part pointed out hereinafter.

BRIEF DESCRIPTION OF THE DRAWINGS

FIG. 1 is a graph depicting the current waveform in one phase of a SRM and illustrates tail current decay in the current waveform;

FIGS. 2A and 2B are graphs of SRM phase current and voltage waveforms respectively and illustrate a soft chopping operation of a current controller for the SRM;

FIGS. 3A and 3B are graphs similar to FIGS. 2A and 2B but for hard chopping operation of the current controller;

FIGS. 4A–4C illustrate a gate signal used for soft chopping during the power "on" portion of a SRM phase (FIG. 4A), as well a simplified schematic of the circuit for both the power "on" (FIG. 4B), and power "off" or current decay portions (FIG. 4C) of the phase;

FIGS. 5A–5C represent an inverted gate signal used during the phase "off" mode of motor operation (FIG. 5A) and simplified schematics of soft chop (FIG. 5B) and hard chop (FIG. 5C) circuits for current decay;

FIG. 7A is a schematic of a portion of the signal generating modules for producing operating signals used to provide hard and soft chopping of the tail current;

FIG. 7B represents a microprocessor with PWM output capability for producing operating signals used to provide the hard and soft chopping;

FIG. 8 is a graph similar to FIG. 1 and represents a prior art tail current decay scheme;

FIG. 9A is another graph similar to FIG. 1 and represents the tail current decay scheme as implemented by the present invention, and FIG. 9B represents an enlarged portion of the tail current decay;

Corresponding reference characters indicate corresponding parts throughout the drawings.

DESCRIPTION OF PREFERRED EMBODIMENTS

Figure 6:
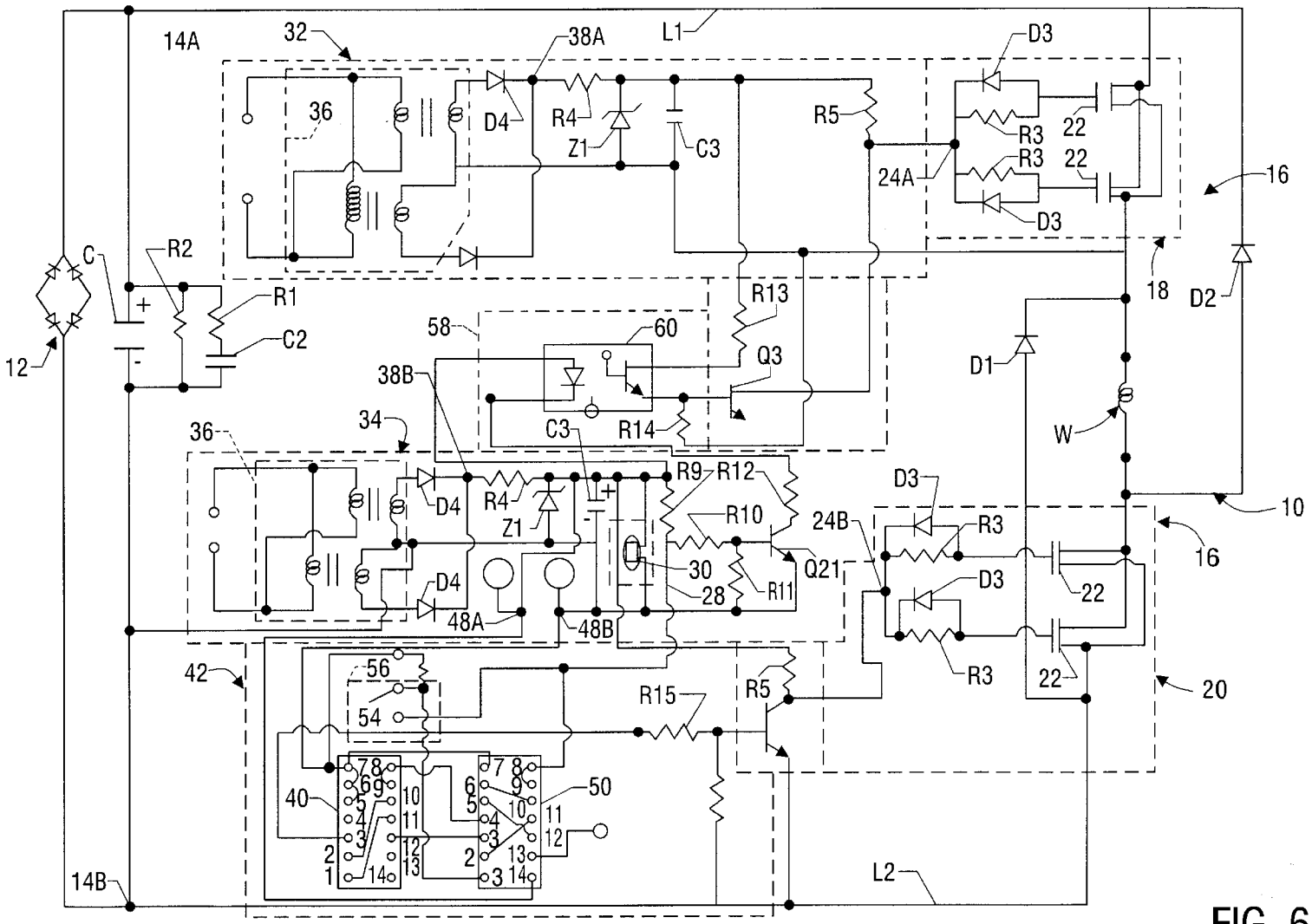
FIG. 6 is a schematic of a first embodiment of a tail current decay control circuit of the present invention.

Referring to the drawings, a switched reluctance motor (not shown) is a motor having 1,2,3,4, or 5 phases and is typically a multiple pole motor. Examples of such motors are a 12-6, 2-phase motor, or a 6-4, 3-phase motor. In operation, each respective phase is energized and de-energized in a sequential manner. The length of time each phase is active is based on various operating parameters and various control schemes have been implemented to determine when switching should occur from one phase to the next. During the interval a phase is active a phase winding W of that phase is supplied current. An idealized current profile for the winding is shown in FIG. 1. As depicted in the graph, power to the phase (current to the winding) commences at time $T_0$. Current is then applied to winding W until a time $T_1$ at which time the particular phase is deactivated or de-energized. As indicated in FIG. 1, there is a significant amount of energy in winding W at this time, and this residual energy must now be recovered or dissipated prior to the phase being reactivated. The current flow which occurs through the phase at this time is a zero volt, tail current decay flow of current and the current flow takes place during the interval from $T_1$–$T_2$.

Figure 10:
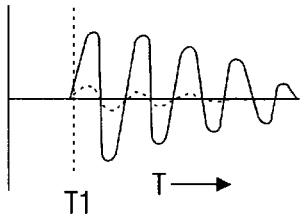
FIG. 10 is a graph illustrating the reduction in motor ringing achievable with the present invention; and, FIGS. 11A–11D represent various PWM frequency and duty cycle combinations by which current decay is controlled.

As shown in FIG. 1, when current input into the phase stops at time $T_1$, the slope of the curve is relatively shallow. However, the slope of the curve as the tail current is driven to zero is very steep. It is known that as the rotor teeth of a motor sweep past the motor's stator teeth, a deflection is caused by the ovalizing forces generated within the motor. When this deflection is accompanied by the abrupt transition in energy which occurs at time $T_1$, the result is a pronounced ringing which is shown by the solid line curve in FIG. 10. This ringing produces noise. There are two ways of reducing the residual or tail current to zero. One such way is to reduce the current gradually; i.e., try to create a shallow slope of the curve from $T_1$ to $T_2$. The other way is to drive the current down abruptly; i.e., to effect a steep curve. The first technique is referred to as soft chopping and the latter as hard chopping. The problem with using soft chopping exclusively is that although it results in less noise, it takes too long. Residual current cannot reach zero before time $T_2$. The problem with hard chopping is that although current is driven to zero by time $T_2$, this approach creates the ringing referred to above.

In FIG. 2A, a current waveform similar to that shown in FIG. 1, shows current chopped in accordance with the "soft" chopping technique. That is, a pulse width modulated signal having an amplitude range of 0 v.–+Vv. is applied to the phase current. It will be noted that a ripple is produced on the current even during the active portion of the phase. Again, a drawback with this approach is the very slow rate at which current is driven to zero.

In FIGS. 3A and 3B, the approach known as "hard" chopping is represented. As shown in FIG. 3B, hard chopping differs from soft chopping in that the pulse width modulated signal has an amplitude ranging from −Vv.–+Vv. Application of this signal to the phase has the effect of driving the current toward zero faster than is possible with the soft chopping signal approach. However, a greater ripple is imposed on the current supplied to the phase winding even during the active portion of the phase; and, the forces produced by this increased down driving of the current increases motor noise.

A third approach is shown in FIG. 8 and reflects the approach by Messers Wu and Pollock in their paper referred to above. As before, current is applied to a phase winding W from time $T_0$–$T_1$. From time $T_1$ to a time $T_x$, current is allowed to zero volt decay (i.e., there is no signal applied to the phase to drive the current toward zero) which corresponds to soft chopping. From time $T_x$ to time $T_2$, a forced commutation signal is applied to the phase to complete driving the current to zero. This corresponds to hard chopping. The interval from $T_1$–$T_x$ is a period equal to one-half the resonant time period of the motor. The effect of this approach is to make the slope of the curve from time $T_1$–$T_x$ shallower than would occur if the current were merely hard chopped to zero. This has the effect of reducing the ringing. After this initial period, the current is hard driven to zero. However, because some of the energy in the phase is dissipated by the time hard driving occurs, the noise produced by the ringing is less pronounced. While beneficial, this approach is limited because there is only one soft driving and one hard driving period within the interval $T_1$–$T_2$. This limits the degree of control which could be effected to further reduce ringing and noise.

A circuit of the present invention for controlling residual or tail current decay in a phase winding W of a polyphase SRM is indicated generally 10 in FIG. 6. It will be understood that while the following description relates to tail current decay control for one motor phase, circuit 10 is operable with respect to all motor phases. As described, current and voltage are applied to the phase winding during each interval when the phase is active, the voltage and current being cut-off from the phase winding when the phase becomes inactive. The remaining energy in the phase winding is then recovered or dissipated depending upon a circuit configuration in which the winding is connected. A first circuit configuration includes the bus capacitor C, which is connected to phase winding W when the phase is inactive, to recover energy from the phase winding. The capacitor is connected in parallel with a series connected resistor and capacitor R1 and C2. These circuit elements are also parallel connected with a resistor R2. Resistor R1 is, for example, a 10 ohm resistor, resistor R2 a 100K ohm resistor, and capacitor C2 a 0.22 microfarad capacitor. Resistor R2 is used to trickle down energy in the capacitor C when the drive is off. Resistor R1 and capacitor C2 form a high frequency filter against voltage spikes which otherwise cause noise in the circuit.

In FIG. 6, winding W is shown connected between rails L1 and L2 via diodes D1 and D2. The diodes and winding form a forced commutation or energy dissipation loop when switches of a switch means 16 are open. Lines L1 and L2 are connected across the output of a full-wave bridge rectifier 12 which is used to rectify the 115VAC input to the motor. The bridge output and bus capacitor are commonly connected at respective nodes 14a and 14b.

To further help in understanding tail current decay, FIG. 4A illustrates a PWM gate signal in which the "on" interval of the signal is substantially less than the "off" portion of the signal. During the "on" portion, a d.c. voltage is applied to the phase winding W (see FIG. 4B). During the "off" portion of the signal, no voltage is applied to the winding. Rather, during this interval, the winding is connected in a closed-loop circuit with a diode D1 (see FIG. 4C) to produce a zero voltage current decay of the current impressed across the winding. In FIG. 5A, the signal used to produce tail current decay in the phase is also a PWM signal. Now, the "on" interval of the pulse is longer than the "off" interval. During the longer "on" interval, a switch S1 is closed to allow the winding W current to circulate through diode D1. During the "off" interval of each pulse, respective switches S1 and S2 on opposite sides of the winding are open. The winding is now connected through two diodes D1 and D2 to a bus capacitor C which is associated with the upper rail of the power input to the motor. Capacitor C is a storage capacitor which is charged with the tail decay current. With respect to FIGS. 5B and 5C, FIG. 5B represents a soft chopping circuit configuration, and FIG. 5C a hard chopping circuit configuration.

Next, circuit 10 includes the switch means 16 for connecting phase winding W into a circuit including capacitor C when the phase becomes inactive. Switch means 16 includes respective first and second sets 18, 20 of switches with set 18 of switches being connected on one side of the phase winding and the set 20 of switches on the other side thereof. Both sets of switches are comprised of two semiconductor switches which are shown in FIG. 6 to be MOSFET's 22. It will be understood that other semiconductor switches could also be used without departing from the scope of the invention. In each set of switches, the pair of switches is connected in parallel, this being done to increase switching capability. Also, each MOSFET has a gate circuit which includes a resistor R3 connected in parallel with a diode D3. Each resistor R3 is, for example, a 100 ohm resistor. The input side of each pair of gate input elements is connected together at respective nodes 24a, 24b. As is described hereinafter, input signals to each set of switches is supplied through modes 24a, 24b.

A sensing means 28 is provided for sensing the motor's rotor position. Means 28 includes a Hall effect sensor 30 which operates in the conventional manner. Each set of switches has an associated power supply 32, 34. Hall effect sensor 30 is connected to the power supply 34 which is associated with set 20 of switches. Both power supplies are similar in configuration. Each power supply includes a step down transformer 36 one side of which is connected to the 115 VAC input power. Rectifying diodes D4 are connected across the output side of the transformer and are commonly connected at respective nodes 38a, 38b. The transformed, rectified input voltage is then impressed across a zener diode Z1 through a resistor R4. The zener diode clamps to the input voltage to the sets of switches to 18 V., for example. A filter capacitor C3 is connected in parallel across each zener diode. The resultant voltage output of power supply 32 is connected to the gate-source portion of the respective MOSFET's 22 of switch set 18, one side of capacitor C3 being connected to node 24a on the gate input side of the set through a resistor R5. One side of capacitor C3 of power supply 34 is connected to an integrated circuit (IC) 40 of a control means 42 which controls routing of operating signals which are generated as described hereinafter. The other side of this second capacitor C3 is connected to the node 24b of switch set 20 again through a resistor R5.

Referring to FIGS. 6 and 7A, a signal generating means 44 provides operating signals to switch means 16 to switch phase winding W into the circuit including bus capacitor C. As shown in FIG. 7A, means 44 includes two interconnected model number 555, IC timing chips 46a, 46b. Means 44 is connected across nodes 48, 50 of power supply 34 to provide power to the chips. Chip 46a has pins 1 and 5 which are connected together through a capacitor C4. Pins 1 and 8 of the chip are connected to one side of the power input at a node 52a, pin 1 being so connected through a capacitor C5. A voltage divider network comprising a resistor R6, potentiometer P1, and capacitor C6 extends across the power lines to signal generating means 44. Pin 6 of chip 46a is connected to one side of the potentiometer, with pin input 7 being connected to the wiper arm of the potentiometer. A diode D5 is connected across these two pins. Pin 3 of the chip is connected to the base of a transistor Q1 through a resistor R7. Pins 2 and 6 are commonly connected as are pins 4 and 8. The output of transistor Q1 is connected to pin 2 of chip 46b. This pin is also connected to the one side of the power to the signal generating means through a resistor R8. As with chip 46a, pins 1 and 8 of chip 46b are connected to one side of the power input of the signal generating means through a capacitor C7. Pin 1 is also connected to pin 5 through a capacitor C8. Pin 7 has as its input the voltage derived from a voltage divider comprising a resistor R9 and a potentiometer P2. The Pin 6 of the chip is connected to the other side of the power input through a capacitor C9. Finally, pins 6 and 7 are tied together as are pins 2 and 4.

Signal generating means 46 functions as a pulse width modulation signal generator whose output from pin 3 of chip 46b is supplied as an input of an IC 50 of control means 42. Alternatively, the operating signal can be produced by a microprocessor 52 as shown in FIG. 7B. Microprocessor 52 is programmed to control the pulse width modulation of the signal produced by means 44 as a function of various SRM operating parameters such as motor speed, torque, etc. The microprocessor is programmed with an algorithm which incorporates various monitored parameters into a calculation which determines desired characteristics (frequency, duty cycle, amplitude, etc.) of the operating signal supplied to the control means.

Control means 42 is responsive to current sensing means 28 to control the operation of signal generating means 44. Both chips 40 and 50 are 14 pin chips; chip 40 having the model designation CD4001, and chip 50 the designation CD4011BE. The operating signal output of signal generating means 44 or 52 is supplied to control means 42 as an input to pin 13 of chip 50. The power to the chips is provided from node 48a to pin 14 on each chip, and from node 48b to pin 7 of each chip, Hall effect sensor 30 provides an input to commonly connected pins 8 and 9 of chip 50 and to the normally open contact 54 of a switch 56. If desired, switch 56 can be used to disengage the current control means controlling operation of circuit 10.

In addition to supplying its output to control means 42, the output of sensor 30 is also provided to the base of a transistor Q2 through the a base biasing network comprising resistors R9–R11. Transistor Q2, in turn, provides an input to an opto-isolator means 58 through a resistor R12. Means 58 includes a model 4N35 type isolator 60 one side of which draws power from power supply means 32 through a resistor R13. The opto-isolator controls switching of a transistor Q3 through a biasing resistor R14. The state of transistor Q3 controls application of power to set 18 of MOSFET switches 22. Switch set 18 is operated so that the switches are either "on" or "off". The switches are turned "on" when the phase is active, and "off" when the phase is inactive.

Control means 42 is responsive to the output of the Hall effect sensor to modify the signal characteristics of the operating signals provided by means 44 so these signals have one set of signal characteristics when the phase is active, and a different set of characteristics when the phase is inactive. Operation of control means 42 is that in response to the Hall effect sensor indicating the phase has become inactive, the control means reverses the duty cycle of the operating signal. Thus, if the operating signals, when the phase is active, is "on" 10% of a pulse period and "off" 90%, when the Hall sensor indicates the phase is now inactive, the indication provided to pins 8 and 9 of chip 50 results in the control means providing an operating signal which is "on" 90% of the time, and "off" 10%. When the phase again becomes active, the Hall sensor output causes a reversal back to the initial duty cycle conditions. It will be understood that the relative "on/off" periods at any one time may differ from those at a different period. Also, the microprocessor can override operation of the control circuit so that under certain defined motor conditions (a period range of motor speeds, for example) the control means will produce a particular set of characteristics so when the "on/off" periods are reversed, the resulting operating signal still has desired characteristics.

The inverted PWM operating signal is produced at pin 3 of chip 40. This signal is applied to the base of a transistor Q4 through a base resistor R15. The ouput of this transistor is supplied to node 24bat the gate input of the MOSFET's 22 of switch set 20. Because the operating signal has "on" and "off" portions, it effectively modulates the elements of switch set 20 so they alternately provide a hard chopping and a soft chopping interval of tail current decay. Accordingly the zero voltage, current chopping dissipation of the tail current is effected with a single set of switches producing both the hard chopping and soft chopping decay strategies described above. This is shown in FIGS. 10A and 10B. At time $T_1$, there is an initial zero voltage soft chopping interval, followed by a shorter duration hard chopping interval. As seen in FIG. 9A, this process is repeated as the tail current is driven to zero. The longer soft chopping interval corresponds to the longer "on" interval of the operating signal, and the shorter hard chopping interval to the shorter "off" period. It will be understood that the relative intervals shown in FIGS. 9A and 9B are illustrative only.

It will be appreciated from the above discussion that one set of operating characteristics of circuit 10 is a reversal of duty cycle of the operating signal for a specified PWM frequency. However, with microprocessor 52 generating PWM signals it is possible to vary either the duty cycle, frequency, or both within the tail current decay time. Referring to FIGS. 11A–11D examples are presented in which the duty cycle or frequency, or both is varied so that the soft chopping and hard chopping portions of an interval are controlled over the several intervals during which the residual current decays to zero. The ability to vary both frequency and duty cycle is important because it provides a greater degree of control over the current slope which permits better noise control over the motor during residual current decay. In the control scheme of FIG. 11A, there is a constant duty cycle of the PWM operating signal during each interval I. Accordingly, the "on" portion of each duty cycle is constant throughout the current decay period $T_1$–$T_2$.

Figure 11A:
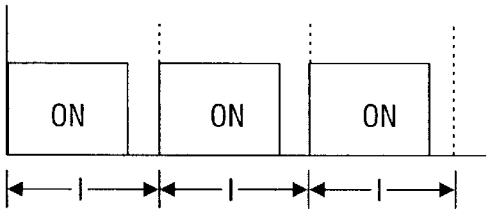
Figure 11B:
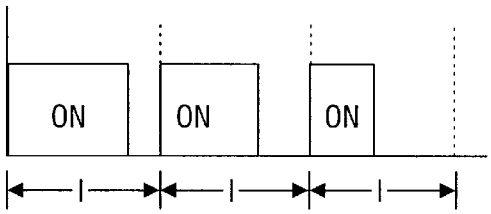

In FIG. 11B, the interval I is constant; however; the duty cycle is varied from one interval to the next. This, for example effects a soft chopping portion which gets progressively shorter during succeeding intervals while the hard chopping portion becomes progressively longer.

Figure 11C:
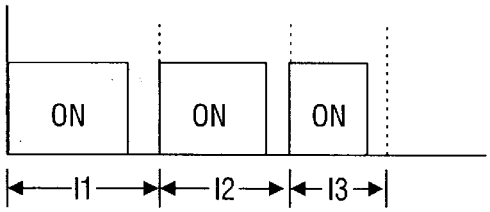

In FIG. 11C, the intervals are variable in duration so that interval $I_1$, is longer the interval $I_2$, etc. However, the duty cycle is constant so that even though the soft and hard chopping portions of each interval are of different lengths, this ratio is constant over the entire current decay period.

Figure 11D:
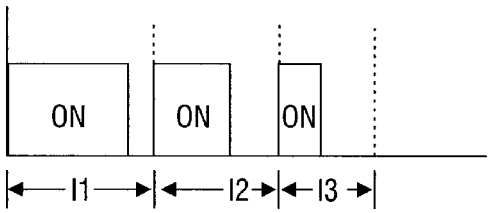

Finally, in FIG. 11D, both the interval I and duty cycle of the PWM operating signals are variable. As noted, the particular PWM characteristics selected to control current decay are a function of the particular SRM operating conditions and as such the chosen set of characteristics may be employed each time the phase become inactive, or a different set may be chosen each time.

Regardless of the actual intervals at which hard chopping and soft chopping occur, the frequency of the signals may be at least twice the resonant frequency of the motor. This prevents noise from being created due to harmonics within the motor frame. It has been found that the effect of circuit 10, in addition to efficiently producing tail current decay is to reduce the motor noise by approximately 10 dBA from a level of some 50 dB. Further, it has been found that circuit 10 is usable with a variety of SRM's, including 2-phase and 3-phase SRM's.

What has been described is a control circuit for controlling tail current decay in a SRM. The circuit operates to control tail current decay so as to lessen motor noise at least 10 dB from the 50 dB levels currently found in SRM's. As shown by the dashed line curve in FIG. 10, the motor ringing which occurs when circuit 10 is used is substantially reduced from the previous level of ringing. To accomplish this, the control circuit combines both hard chopping and soft chopping current decay control techniques, doing so with but a single gate drive. The control circuit is usable with both 2-phase and 3-phase SRM's including 12-6, 2-phase SRM's, and 6-4, 3-phase SRM's. The control circuit is readily incorporated into a PWM type controller for controlling overall phase switching between the respective phases of a SRM. As part of its operation, the control circuit which reverses the pulse width of generated PWM signals used to control current flow when a phase is inactive, this helping drive the tail current to zero while the phase is inactive. The control circuit employs two sets of switches; one set being either activated or deactivated as the motor phases are switched, and the other set of which is modulated by PWM signals. It is a feature of the control circuit to reverse the "on" and "off" portions of the PWM signals when a phase is switched from active to inactive. The control circuit switches the phase winding into a path including a bus capacitor which is charged by the tail current using the PWM modulation of the switches. The tail current control circuit is particularly effective in reducing noise in SRM's operating at low speed/high torque because normal ovalizing forces which produce noise in SRM's are lower at high speed motor operation. This is because the control circuit varies both frequency and duty cycle to effect a desired soft chopping/hard chopping strategy. Also, the control circuit operates at a frequency at least twice the resonant frequency of the motor. Finally, the control circuit provides a low cost, reliable way of reducing noise throughout the range of SRM operation.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A circuit for controlling residual current decay in a single or polyphase SRM comprising:

sensing means for sensing the position of a rotor of the motor;

switch means for directing current flow into a phase winding of the motor when the phase is active and for recovering or dissipating energy in the winding when the phase is inactive, the switch means comprising a first set of switches and a second set of switches, said sets of switches being on respective sides of the phase winding with one set of switches being activated when the phase is active, and deactivated when the phase is inactive;

signal generating means providing an operating signal to the switch means to control current flow and recovery or dissipation, the signal generating means including a PWM signal generator whose output signal pulse width and frequency are a function of the SRM's operating characteristics, the second set of switches being modulated by operating signals from the signal generating means whereby operation of the second set of switches is controlled as a function of the signal characteristics of the operating signal;

a capacitor connected in series with the phase winding and charged by the current in the phase winding when the phase becomes inactive thereby to recover a portion of the energy; and control means responsive to the sensing means for controlling the signal generating means for the signal generating means to provide operating signals having operating characteristics which differ when a phase is active and when it is not, thereby to facilitate energy recovery or dissipation when the phase becomes inactive, the control means effecting both frequency and/or duty cycle of the operating signals to control the rate of decay of the current and consequently motor noise, the control means being responsive to inputs from the sensing means when the phase becomes inactive to reverse the pulse width of the PWM operating signals produced by the signal generating means from those which are produced when the phase is active.

2. The circuit of claim 1 wherein the control means drives the signal generating means to produce an operating signal which provides a soft chopping of the tail current during one portion of a pulse cycle, and a hard chopping the remainder of the cycle.

3. The circuit of claim 2 further including gate means to which the PWM signal is supplied, the gate means deriving control signals for each set of switches from the PWM signals produced by the signal generating means to deactivate the first set of switches when the phase is inactive and to modulate switching of the second set of switches in accordance with the PWM signal characteristics.

4. The circuit of claim 1 wherein the first and second set of switches each comprise a pair of semiconductor switches connected in parallel.

5. The circuit of claim 4 further including power supply means for each set of switches, each power supply means including transformer means for stepping down the line voltage supplied to the SRM, and voltage regulator means for regulating the stepped down voltage.

6. The circuit of claim 1 further including rectification means for full-wave rectifying the phase voltage to the winding.

7. The circuit of claim 1 wherein the sensing means comprises a Hall effect sensor.

8. The circuit of claim 1 wherein the control means includes a microprocessor which receives inputs concerning the SRM's operating characteristics and controls the signal characteristics of the operating signal produced by the signal generating means as a function of these inputs.

9. Apparatus for controlling tail current decay in a winding of a single or polyphase SRM, current and voltage being applied to the winding during each interval when the phase is active, the voltage and current being cut-off from the winding when the phase becomes inactive with the energy in the winding being recovered or dissipated under a zero volt condition, the apparatus comprising:

a bus capacitor for storing energy recovered from the winding;

switch means for connecting the phase winding into a circuit including the capacitor when the phase becomes inactive, the switch means including respective first and second sets of switches with one set of switches being connected on one side of the winding and the other set of switches on the other side thereof;

power dissipation means series connected with the winding;

sensing means for sensing the position of a rotor of the motor;

signal generating means providing an operating signal to the switch means to alternately switch the winding into a circuit including the bus capacitor and a circuit including the power dissipation means, the operating signals being used to modulate the state of one of the sets of switches to provide both a hard chopping and a soft chopping of the current; and, control means responsive to the sensing means for controlling operation of the signal generating means for the signal generating means to provide operating signals having one set of signal characteristics when a phase is active, and a different set of characteristics when the phase is inactive so to produce the zero voltage, energy recovery and dissipation of the tail current, the control means controlling both the frequency and duty cycle of the operating signals to effect the recovery and dissipation of the tail current and reduce motor noise.

10. The apparatus of claim 9 wherein the control means controls the signal generating means to maintain one of the sets of switches closed during the tail current decay period and switch the other set of switches between their open and closed positions at a rate controlled by the pulse width of the operating signals supplied to this said other set of switches, the tail decay current being soft chopped when the said other set of switches are closed, and hard chopped when the said other set of switches are open.

11. The apparatus of claim 10 wherein the signal generating means includes a PWM signal generator whose output signal pulse width and frequency are a function of the SRM's operating characteristics, the control means being responsive to inputs from the sensing means when the phase becomes inactive to reverse the duty cycle of the PWM operating signals produced by the signal generating means from those which are produced when the phase is active.

12. The apparatus of claim 11 further including gate means for each set of switches to which the PWM signals are supplied, the gate means deriving control signals for each respective set of switches from the PWM signals to deactivate the first set of switches when the phase is inactive and to modulate switching of the second set of switches in accordance with the PWM signal characteristics.

13. The apparatus of claim 9 wherein the sensing means comprises a Hall effect sensor.

14. The apparatus of claim 9 wherein the control means includes a microprocessor which receives inputs concerning the SRM's operating characteristics and controls the signal characteristics of the operating signal produced by the signal generating means as a function of these inputs, the microprocessor adjusting both the frequency and duty cycle of the PWM signals.

15. A method for controlling tail current decay in a phase winding of a single or polyphase SRM, current and voltage being applied to the phase winding during each interval when the phase is active with the voltage and current being cut-off from the phase winding when the phase becomes inactive, the energy in the phase winding when the phase becomes inactive having to be recovered or dissipated under a zero volt condition, the method comprising:

switching the phase winding into a circuit including a bus capacitor which stores current to recover energy while the phase is inactive, switching the phase winding into the circuit including switching respective first and second sets of switches, one set of switches being connected to one side of the phase winding and the other set of switches being connected on the other side thereof;

alternately switching the winding into an energy dissipation circuit to dissipate a portion of the energy, the winding being switched back and forth between the respective circuits over a plurality of intervals so to decay the current in a controlled manner;

sensing the rotor position of the motor while the phase is inactive;

generating and supplying an operating signal to the switches to effect switching of the phase winding between the bus capacitor circuit and the energy dissipation circuit; and, modulating the operation of one of the sets of switches with the operating signals whereby one set of switches remains closed throughout the interval when the phase is inactive and the other set of switches is switched back and forth between open and closed at a modulating frequency determined by the signal characteristics of the operating signal for the tail current to be hard chopped during each interval when both sets of switches are closed, and soft chopped during each interval when the one set of switches is closed and the other set of switches is open thereby to provide a zero volt current decay which is controlled so as to minimize motor noise.

16. The method of claim 15 wherein generating an operating signal includes generating a PWM signal the pulse width and frequency of which are a function of the SRM's operating characteristics.

17. The method of claim 16 wherein modulating operation of the one set of switches includes reversing the duty cycle of the PWM operating signals produced by a signal generating means from that which the operating signals have when the phase is active.

18. The method of claim 16 wherein sensing the rotor position includes sensing with a Hall effect sensor.

19. The method of claim 15 further including controlling the signal characteristics of the operating signals with a microprocessor receiving inputs concerning the SRM's operating characteristics.

20. A method of decaying the residual current in a winding of a single or polyphase SRM, current being supplied to the winding when the phase is active and the residual current being the current remaining in the winding when the phase become inactive, the method comprising:

switching the winding between a first circuit which is an energy recovery circuit to recover a portion of the energy represented by the residual current and a second circuit which is an energy dissipation circuit which dissipates a portion of the energy represented by the residual current;

controlling the switching of the winding between the energy recovery and energy dissipation circuits in a controlled manner by which the residual current is decayed to zero so as to cause minimal ringing in the motor and thereby reduce motor noise, controlling switching of the winding including switching the winding between the circuits over a plurality of intervals with the winding being switched into one circuit for a portion of each interval and into the other circuit the remainder of the interval, both the duration of each interval and the portion thereof in which the winding is switched into one circuit or the other being variable in a predetermined manner.

21. The method of claim 20 wherein controlling switching of the winding between the respective circuits involves controlling at least one switch used to accomplish switching of the winding with PWM operating signals, the frequency and duty cycle of the PMW signals being variable to vary either the length of each interval during which the winding is connected to both of the respective circuits and the portion of each interval in which the winding is connected in one circuit or the other, the duty cycle of the PWM signals, or both.

22. A circuit for controlling residual current decay in a single or polyphase SRM comprising:

switches for directing current flow into a phase winding of the motor when the phase is active and for recovering or dissipating energy in the winding when the phase is inactive, a PWM signal generator providing an operating signal to the switches to control current flow and recovery or dissipation of residual current;

a capacitor connected in series with the phase winding and charged be the current in the phase winding when the phase becomes inactive thereby to recover a portion of the energy; and control means for controlling the signal generated by the PWM signal generator to provide operating signals having operating characteristics which differ when a phase is active and when it is not, thereby to facilitate energy recovery or dissipation when the phase becomes inactive, the control means reversing the pulse width of the operating signals produced by the PWM signal generator when the phase becomes inactive from the pulse width of the operating signals which are produced when the phase is active.

23. Apparatus for controlling tail current decay in a winding of a single or polyphase SRM, current and voltage being applied to the winding during each interval when the phase is active, the voltage and current being cut off from the winding when the phase becomes inactive with the energy in the winding being recovered or dissipated under a zero volt condition the apparatus comprising:

a capacitor for storing energy recovered from the winding;

switches for connecting the phase winding into alternate circuit configurations when the phase becomes inactive;

power dissipation means connected with the winding;

a signal generator providing an operating signal to the switches to alternately switch the winding into a circuit including the capacitor and a circuit including the power dissipation means, the operating signals being used to modulate the state of the switches to provide both a hard chopping and a soft chopping of the current; and control means for controlling operation of the signal generator to provide operating signal having one set of signal characteristics when a phase is active and a different set of characteristics when the phase is inactive so to produce the zero voltage, energy recovery and dissipation of the tail current, the control means controlling both the frequency and duty cycle of the operating signals to effect the recovery and dissipation of the tail current and reduce motor noise.

24. A method for controlling tail current decay in a phase winding of a single or polyphase SRM, current and voltage being applied to the phase winding during each interval when the phase is active, with the voltage and current being cut-off from the phase winding when the phase becomes inactive, the energy in the phase winding when the phase becomes inactive having to be recovered or dissipated under a zero volt condition, the method comprising:

switching the phase winding into a recovery circuit including a capacitor to recover energy while the phase is inactive;

alternately switching the winding into an energy dissipation circuit to dissipate a portion of the energy while the phase is inactive the winding being switched back and forth between the energy recovery circuit and the energy dissipation circuit over a plurality of intervals so to decay the current in a controlled manner;

generating and supplying an operating signal to control switching of the phase winding between the energy recovery circuit and the energy dissipation circuit; and modulating the operation of the switches with the operating signals to provide repeated intervals of zero volt current decay which are controlled so as to minimize motor noise.

25. A circuit for controlling residual current decay in a winding of a switched reluctance machine to reduce machine noise, the circuit comprising:

a DC voltage source providing a DC voltage, the DC voltage source defining positive and negative DC rails;

a phase winding, the phase winding having first and second ends;

a switching circuit including a first switching device coupled to the positive DC rail and to the first end of the phase winding and a second switching device coupled to the negative DC rail and to the second end of the phase winding, wherein the first and second switching devices are controlled to: (i) electrically couple the phase winding across the DC voltage source such that the negative of the DC voltage provided by the DC voltage source is applied across the phase winding, or (ii) electrically isolate at least one end of the chase winding from the DC voltage source such that the volume across the phase winding is approximately zero; and a control circuit coupled to the switching circuit for controlling the first and second switching devices such that the voltage applied to the phase winding during the interval of residual current decay comprises repeated periods of differing voltage levels having a magnitude that is selected from at least one of the following values: (i) the negative of the DC voltage provided by the DC voltage source; or (ii) the voltage established by connecting the phase winding in a closed-loop circuit hit a semiconductor device.

26. A method of reducing the amount of noise produced by a switched reluctance machine, the switched reluctance machine having a plurality of phase windings, the method comprising the steps of:

actively energizing a first phase windings such that the current in the first phase winding begins to increase from zero to a peak positive value over a first interval; and controlling the decay of the current in a second phase winding over the first interval by applying a plurality of periods of differing voltage levels to the second phase winding over the first interval, where the voltage levels have a magnitude selected from the group of: a negative DC voltage or the voltage resulting from connecting the second phase winding in a closed-loop circuit with a semiconductor device;

wherein the application of the plurality of periods of differing voltage levels applied to the second phase winding is controlled to reduce the amount of noise produced by the machine.

27. The method of claim 26 wherein plurality of periods of differing voltage levels applied to the second phase winding includes periods of voltage levels having a negative DC voltage magnitude and period, of voltage levels having a magnitude established by connecting the second phase winding in a closed-loop circuit with a semiconductor device.

*28. The method of claim 26 wherein: (i) the switched reluctance machine includes at least one resonant frequency, and (ii) the step of controlling the decay of the current in the second phase winding over the first interval by applying a plurality of periods of differing voltage levels to the second phase winding includes the step of applying the plurality of periods of differing voltages at a frequency that is at least twice the resonant frequency of the machine.*

*29. The method of claim 26 wherein the step of controlling, the decay of the current in the second phase winding over the first interval by applying a plurality of periods of differing voltage levels to the second phase winding includes the step of varying the frequency at which the plurality of periods of differing voltage are applied to the second phase winding.*

*30. The method of claim 26 wherein the step of controlling the decay of the current in the second phase winding over the first interval by applying a plurality of periods of differing voltage levels to the second phase winding includes the step of varying the duty cycle of the plurality of periods of differing voltages applied to the second phase winding.*

*31. The method of claim 26 wherein the step of controlling the decay of the current in the second phase winding over the first interval by applying a plurality of periods of differing voltage levels to the second phase winding includes the steps of: (i) varying the frequency at which the plurality of periods of differing voltage are applied to the second phase winding, and (ii) varying the duty cycle of the plurality of periods of differing voltage applied to the second phase winding.*

*32. A method of reducing the amount of noise produced by a switched reluctance machine, the switched reluctance machine having at least one phase winding, the method comprising the steps of:*

*actively energizing a first phase winding over a first interval such that the current in the first phase winding reaches a peak positive value; and*

*controlling the decay of the current in the first phase winding over a second interval following the first interval by applying a plurality of periods of differing voltage levels to the first phase winding over the second interval, where the periods of differing voltage levels have a magnitude selected from the group of: (i) a negative DC voltage or (ii) the voltage resulting from connecting the first phase winding in a closed-loop circuit with a semiconductor device;*

*wherein the application of the plurality of differing voltage levels applied to the phase winding is controlled to reduce the amount of noise produced by the machine.*

*33. The method of claim 32 wherein the plurality of periods of differing voltage levels applied to the first phase winding in the step of controlling the decay of the current in the first phase winding includes periods of voltage levels having both a negative DC voltage magnitude and a voltage magnitude resulting from connecting the first phase winding in a closed-loop circuit with a semiconductor device.*

*34. The method of claim 32 wherein: (i) the switched reluctance machine includes at least one resonant frequency, and (ii) the step of controlling the decay of the current in the first phase winding over the second interval by applying a plurality of periods of differing voltage levels to the first phase winding includes the step of applying the plurality of periods of differing voltage at a frequency that is at least twice the resonant frequency of the machine.*

*35. The method of claim 32 wherein the step of controlling the decay of the current in the first phase winding over the second interval be applying a plurality of periods of differing voltage levels to the first phase winding includes the step of varying the frequency at which the plurality of periods of differing voltage are applied to the first phase winding.*

*36. The method of claim 32 wherein the step of controlling the decay of the current in the first phase winding over the second interval by applying a plurality of period, of differing voltage levels to the first phase winding includes the step of varying the duty cycle of the plurality of periods of differing voltage applied to the first case winding.*

*37. The method of claim 32 wherein the step of controlling the decay of the current in the first phase winding over the second interval by applying a plurality of periods of differing voltage levels to the first phase winding includes the steps of: (i) varying the frequency at which the plurality of periods of differing voltage are applied to the first phase winding and (ii) varying the duty cycle of the plurality of periods of differing voltage applied to the first phase winding.*

*38. Apparatus for controlling the decay of current in the phase winding of a switched reluctance machine from a positive value to zero, the apparatus comprising:*

*a DC voltage source;*

*a switching device coupled to the voltage source and to the phase winding for controlling the application of voltage to the phase winding;*

*a control circuit coupled to the switching device, the control circuit adapted to provide a series of pulsed gating signals to the switching device to control the switching device such that the current in the phase winding falls from the positive value to zero in a controlled fashion.*

*39. The apparatus of claim 38 wherein the series of pulsed gating signals provided by the control circuit is such that the voltage applied to the phase winding during the period of current decay repeatedly varies from a negative voltage magnitude to approximately zero volts.*

*40. A method of controlling current in a switched reluctance machine, the machine including a rotor, and a phase winding, the method comprising the steps of:*

*applying electrical power to the phase winding over a first interval of rotor rotation such that the current in the phase winding increases from zero to a positive value; and*

*controlling the application of electrical power to the phase winding for a period following the first interval such that the current in the phase winding decreases from the positive value to zero through two or more decay intervals, where the slope of the current decay varies over each decay interval.*

*41. The method of claim 40 wherein the step of controlling the application of electric power to the phase winding includes the steps of: (i) applying a negative voltage to the phase winding over a first decay intervals and (ii) applying a voltage resulting from connecting the phase winding in a closed-loop circuit with a semiconductor device to the phase winding over a second decay interval; wherein the slope of the current decay over the second decay interval is less than the slope of the current decay over the first decay interval.*

*42. The method of claim 40 wherein the step of controlling the application of electric power to the phase winding includes the step of applying a series of pulse width modulated voltage pulses to the phase winding.*

* * * * *